United States Patent Office 3,647,764
Patented Mar. 7, 1972

3,647,764
POLYMERIZATION OF 2-PYRROLIDONE IN THE PRESENCE OF CARBONYL SULFIDE
Donald E. Sargent, Schenectady, N.Y., assignor to Radiation Research Corporation, Stamford, Conn.
No Drawing. Filed Aug. 28, 1969, Ser. No. 853,951
Int. Cl. C08g 20/18
U.S. Cl. 260—78 P
5 Claims

ABSTRACT OF THE DISCLOSURE 2-pyrrolidone is polymerized in the presence of an alkaline polymerization catalyst and carbonyl sulfide to form a polymer useful for melt extrusion into fibers, films and other articles.

---

This invention relates to the polymerization of 2-pyrrolidone in the presence of carbonyl sulfide (COS).

Methods for the polymerization of 2-pyrrolidone to form polypyrrolidone have been previously disclosed, for example, in U.S. Pats. 2,638,463, 2,809,958 and 2,891,038. In general, these methods involve the polymerization of 2-pyrrolidone in the presence of an alkaline polymerization catalyst, if desired with an activator.

The polymer formed from 2-pyrrolidone is believed to be a linear polyamide, which has come to be known as nylon-4, having the structure:

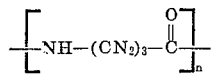

The polymer may be shaped into ribbons, films, molded articles and fibers.

The present invention provides a method of making a polymer of 2-pyrrolidone, which comprises polymerizing 2-pyrrolidone in the presence of an alkaline polymerization catalyst and in the presence of COS. If desired, $CO_2$ may also be included in the reaction system in admixture with the COS. The use of $CO_2$ in the polymerization of 2-pyrrolidone is described and claimed in Carl E. Barnes' applications 711,926, filed Mar. 11, 1968 and 763,898, filed Sept. 30, 1968.

In the Barnes' applications mentioned above, a new class of 2-pyrrolidone polymers is disclosed and claimed which can be subjected to the rigors of melt extrusion, e.g. melt spinning, to form pellets, fibers, etc. The 2-pyrrolidone polymers in the Barnes' applications have a low dispersity ratio, e.g. a dispersity ratio of not more than about 5 or 10. The dispersity ratio is the ratio of the average weight molecular weight (Mw.) to the average number molecular weight (Mn.). The dispersity ratio can be calculated by dividing the weight average molecular size (Aw.) by the number average molecular size (An).

The molecular weight distribution curves of these new polymers of the Barnes' applications have the shape of the typical Gaussian distribution curve. Polymers of 2-pyrrolidone prepared according to the present invention also have a low dispersity ratio, e.g. a dispersity ratio of not more than about 5, and also have molecular weight distribution curves having the shape of the typical Gaussian distribution curve. As compared to the polymers of the Barnes' applications, the polymers of the present invention tend to be of lower dispersity ratio and lower molecular weight.

In general, the polymers of the present invention have a dispersity ratio of less than about 5 and an inherent viscosity of not more than about 3 deciliters per gram, when the catalyst system consists of the alkaline polymerization catalyst and COS. However, when $CO_2$ is also present in the catalyst system, the dispersity ratio and molecular weight increase as the ratio of $CO_2$ to COS increases until the polymers fully take on all of the characteristics of the polymers of the Barnes' applications when there is 100% $CO_2$ and no COS.

The polymer of the invention can be used for melt extrusion into films or fibers. Wet spinning can also be used. The polymer of the invention may also be used as a molding powder.

The polymer of the invention can be prepared by polymerizing 2-pyrrolidone using an alkaline polymerization catalyst in the presence of COS. For example, polymerization can be effected by bubbling COS through a mixture of 2-pyrrolidone and an alkali metal salt of 2-pyrrolidone, e.g. sodium or potassium pyrrolidonate, the alkali metal pyrrolidonate functioning as an alkaline polymerization catalyst.

The reaction conditions for the polymerization of 2-pyrrolidone are essentially the same as that already described in the prior art. In general, 2-pyrrolidone monomer may be polymerized at a temperature from about 18° C. to about 100° C., preferably 25° C. to 70° C., and most preferably 25° C. to 60° C., under a pressure ranging from subatmospheric to superatmospheric in the presence of the alkaline polymerization catalyst. Bulk polymerization or suspension polymerization can be used. A technique using an anhydrous non-solvent, such as hydrocarbon, is suitable, as described in U.S. Pat. 2,739,959.

The catalyst may be any alkaline catalyst for polymerizing 2-pyrrolidone, such as those disclosed in previously mentioned U.S. Pat. 2,638,463, except that it is necessary to avoid the alkali metals or any other agent that may reduce the sensitive 2-pyrrolidone ring thereby introducing impurities which may be harmful to the polymerization reaction. Suitable catalysts are derivatives of the alkali metals, e.g., the hydrides, hydroxides and oxides of the alkali metals. The alcoholates of the alkali metals, such as sodium methylate, may also be used with good results. The preferred catalyst is the alkali metal salt of 2-pyrrolidone, e.g. sodium or potassium pyrrolidonate.

In addition, the oxides and hydroxides of the alkaline earth metals, for example, calcium and barium, may be used as catalysts. Also, organic metallic compounds, preferably those which are strongly basic, may be used, such as the lithium, potassium and sodium alkyls, e.g. butyl lithium, and the aryls of the alkali metals, such as sodium phenyl and sodium amide. The catalyst may be a quaternary ammonium base as described in U.S. Pat. 2,973,343 of the formula:

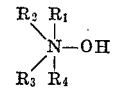

wherein $R_1$, $R_2$ and $R_3$ are lower alkyl radicals and $R_4$ is an alkyl, aryl or aralkyl radical. Further, as previously mentioned, the catalyst may be an alkali metal hydride, such as sodium hydride, as described in U.S. Pat. 3,075,953. While certain alkali metal derivatives can be used, many of them are undesirable. For example, the alkali metal carbonates as well as the alkaline earth metal hydroxides tend to be insoluble and for this reason are undesirable. Lithium hydroxide (monohydrate) also is insoluble in 2-pyrrolidone.

The catalyst may be used in an amount of 0.5 to 50% by weight, based on the 2-pyrrolidone monomer, preferably 5 to 30 wt. percent, most preferably 8 to 20 wt. percent.

The ratio of COS to the polymerization catalyst does not appear to be critical. A suitable procedure is to bubble COS gas through a solution of the alkali metal pyrrolidonate in 2-pyrrolidone until the COS is no longer absorbed.

This can be conveniently determined by monitoring the pressure over the solution of the alkali metal pyrrolidonate in a confined chamber. While the COS is being absorbed, it is reacting with the pyrrolidonate and the pressure remains constant. When the COS stops being absorbed, the pressure quickly rises due to the rapid build-up of COS introduced into the system.

When $CO_2$ is used together with the COS, the $CO_2$ and COS are conveniently added as a mixture.

It is presently preferred to carry out the polymerization of 2-pyrrolidone in the following manner. First, the 2-pyrrolidone monomer is reacted with an alkali metal hydroxide, preferably NaOH or KOH, the water formed in the reaction being removed by distillation, so as to form in situ a strictly anhydrous solution of the alkali metal salt of the 2-pyrrolidone in the 2-pyrrolidone to be polymerized. Instead of the alkali metal hydroxide, the alkali metal pyrrolidonate can be formed using an alkali metal alcoholate, preferably $NaOCH_3$ or $KOCH_3$, to form a solution of alkali metal pyrrolidonate in 2-pyrrolidone. Any source of alkali metal can be used to form the pyrrolidonate, provided that undesired by-products are not formed and that the sensitive pyrrolidone ring is not destroyed. Undesired by-products are those that act as polymerization inhibitors. Sodium metal is an example of a source of alkali metal that should not be used. After removal of water from the reaction mixture, dry COS is bubbled through the solution to start the polymerization. If desired, additional 2-pyrrolidone monomer can be added to the alkali metal pyrrolidonate solution after removal of the water but before introduction of the COS.

Suitably, the 2-pyrrolidone monomer will be contacted with 0.01 to 14 wt. percent of COS, based on the weight of the 2-pyrrolidone monomer. Presently preferred amounts are 0.3 to 8 wt. percent, based on the weight of the 2-pyrrolidone, while 0.7 to 7 wt. percent are the most preferred amounts. When a mixture of COS and $CO_2$ is used, the $CO_2$ will replace an amount of COS in the ratio of each 44 parts by weight of $CO_2$ replacing 60 parts by weight COS.

It is preferred to utilize the polymerization catalyst with COS or a mixture of COS and $CO_2$ as the polymerization activator, but other polymerization activators may be used in conjunction with COS. When this is done, polymers having bilobal molecular weight distribution curves may be formed, the COS causing the formation of a peak in the higher molecular weight area of a molecular weight distribution curve and the other activator causing the formation of a peak in the lower molecular weight area. A mixture of $CO_2$ and COS gives only a single peak in the molecular distribution curve, indicating that the polymerization of 2-pyrrolidone in the presence of COS has the same reaction mechanism as the polymerization of 2-pyrrolidone in the presence of $CO_2$.

Other activators which may be used in conjunction with COS are the acyl compounds discussed in previously mentioned U.S. Pat. 2,809,958, such as organic acyl peroxides, carboxylic acid anhydrides, lactones, lactides, N-acyl derivatives of lactams, acyl halides, and alcohol esters of carboxylic acids. In general, any of the activators proposed for 2-pyrrolidone polymerization may be used.

When it is desired to use one of these activators along with COS, it is preferred to use acetyl pyrrolidone, adipyl dipyrrolidone or phenylisocyanate. When employed, the other activator may be used in an amount of 0.001 to 25% by weight, based on the 2-pyrrolidone monomer, preferably 0.01 to 5 wt. percent, most preferably 0.1 to 3 wt. percent.

It is preferred that the 2-pyrrolidone monomer be purified, e.g. by fractional distillation under reduced pressure or by recrystallization or a combination of both. Distillation at about 80° to 150° C. under reduced pressure, such as about 0.5 to about 50 mm. Hg, has been found suitable.

A preferred purification technique is as follows. Commerically available 2-pyrrolidone is subjected to aqueous caustic hydrolysis to hydrolyze impurities such as amides and esters, and primarily to hydrolyze any amides of 1,4-diaminobutane. Good results have been obtained by using 20 grams of potassium hydroxide (reagent grade) and 100 grams of water per liter of 2-pyrrolidone. The mixture is boiled under reflux for 15 minutes to 24 hours, preferably 8 to 12 hours, and then a primary distillate is recovered.

The primary distillate is treated with caustic (e.g. 20 g. KOH pellets per liter) and distilled to give a new distillate. This new distillate is treated with caustic (e.g. 20 g. KOH pellets per liter) and distilled to give the purified monomer.

Alternatively, the primary distillate can be treated with acid (5 cubic centimeters of phosphoric acid per liter of distillate has been employed), and distilled, and the new distillate thus formed can be treated with caustic (e.g. 20 grams KOH pellets per liter) and distilled once more. This final distillation from caustic removes any phosphoric acid or oxide that may be carried over from the preceding acid distillation to give the purified monomer.

The following specific examples are intended to illustrate the invention more fully and are not intended to limit its scope.

EXAMPLE 1

1400 ml. of purified 2-pyrrolidone was placed in a flask equipped for vacuum distillation and 70 grams of potassium hydroxide pellets of 85% assay was added. The flask was swept with dry nitrogen, placed under reduced pressure and then the mixture was distilled to remove the water formed by the reaction of the potassium hydroxide with the 2-pyrrolidone to form the potassium pyrrolidonate. Bumping was prevented by bleeding in a small amount of the dry nitrogen through a tube extending beneath the surface of the liquid. 500 ml. of the 2-pyrrolidone was distilled over to insure dryness.

The potassium pyrrolidonate solution was then cooled to about 25° C. With the system still under reduced pressure, dry COS gas was bubbled through the solution until there was an increase in pressure as indicated by a mercury manometer. The mixture was then poured into a 1 quart glass container; the container was sealed and placed in an oven at 50° C. for 16 hours. After this time the glass was broken away and the hardened white polymer was cut and then ground to a powder. It was washed 6 times with deionized water and dried for several hours at about 80° C.

The conversion to polymer was 40%. The inherent viscosity was less than 1.1 dl./gram. The molecular weight distribution curve for this polymer, which was determined by gel permeation chromatography, had a single peak cresting between counts 20 and 21, corresponding to a chain length of about 700 angstroms. The number average molecular size (An) was 649 angstroms and the weight average molecular size (Aw) was 1514 angstroms. The dispersity ratio was thus 2.33.

EXAMPLE 2

A polymerization was carried out in exactly the same manner as Example 1, except that the polymer was kept in the 50° C. oven for 3½ hours, rather than 16, before being processed. The inherent viscosity was less than 1.1. The molecular weight distribution curve by gel permeation chromatography was characterized by a single peak cresting between counts 20 and 21, corresponding to a chain length of about 700 angstroms. An was 601 angstroms, Aw was 1436 angstroms, and the dispersity ratio was thus 2.39.

EXAMPLES 3-7

Using the procedure of Example 1, 2-pyrrolidone was polymerized with mixtures of COS and $CO_2$ and with $CO_2$ alone. The results are reported in Table I below. For convenience, Table I includes the results of Examples 1 and 2.

TABLE I

| Example | Gas | Weight ratio COS:CO₂ | Time in 50° C. oven (hours) | Conversion to polymer (percent) | Color of polymer | Inherent viscosity (dl./g.) | Dispersity ratio |
|---|---|---|---|---|---|---|---|
| 1 | 100% COS | | 16 | 40 | White | <1.1 | 2.33 |
| 2 | 100% COS | | 3½ | | do | <1.1 | 2.39 |
| 3 | COS/CO₂ | 80:20 | 72 | 67 | Yellowish | <1.1 | 1.94 |
| 4 | COS/CO₂ | 50:50 | 72 | 69 | do | <1.1 | 1 90 |
| 5 | COS/CO₂ | 20:80 | 96 | 73 | do | <1.1 | |
| 6 | COS/CO₂ | 2.5:97.5 | 72 | 66 | do | 2.65 | 3.68 |
| 7 | 100% CO₂ | | 120 | 28 | White | 3.9 | 6.2 |

I claim:
1. A process for the production of a polymer of 2-pyrrolidone in solid form, which comprises forming an essentially anhydrous mixture comprising 2-pyrrolidone, an alkaline polymerization catalyst and carbonyl sulfide in an amount of from 0.01 to 14 wt. percent of carbonyl sulfide, based on the weight of the 2-pyrrolidone, and polymerizing said 2-pyrrolidone in said essentially anhydrous mixture.

2. A process according to claim 1, which comprises reacting 2-pyrrolidone with a source of alkali metal that will not reduce the pyrrolidone ring, said source of alkali metal being used in an amount less than the stoichiometric amount necessary to convert all the 2-pyrrolidone to the alkali metal pyrrolidonate, removing any water formed during the reaction to leave an anhydrous solution of the alkali metal pyrrolidonate in 2-pyrrolidone, contacting the solution with carbonyl sulfide, and then polymerizing the 2-pyrrolidone in said solution.

3. The process of claim 1, wherein the polymerization is effected in the presence of a mixture of carbonyl sulfide and carbon dioxide containing from about 2.5 to 80% by weight of carbonyl sulfide, based on the weight of the mixture of carbonyl sulfide and carbon dioxide.

4. The process of claim 2, wherein the source of alkali metal is selected from the group consisting of sodium hydroxide, potassium hydroxide, sodium methylate, and potassium methylate.

5. The process of claim 2, wherein the solution is contacted with a mixture of carbonyl sulfide and carbon dioxide containing from about 2.5 to 80% by weight of carbonyl sulfide, based on the weight of the mixture of carbonyl sulfide and carbon dioxide.

References Cited
UNITED STATES PATENTS

| | | | |
|---|---|---|---|
| 3,017,393 | 1/1962 | Ney | 260—78 |
| 3,026,301 | 3/1962 | Ney | 260—78 |
| 3,052,654 | 9/1962 | Roth et al. | 260—78 |
| 3,072,615 | 1/1963 | Riedesel | 260—78 |
| 3,174,951 | 3/1965 | Taber | 260—78 |
| 3,180,855 | 4/1965 | Black | 260—78 |
| 2,912,415 | 11/1959 | Black et al. | 260—78 |

OTHER REFERENCES

Noble —Doctoral Dissertation Series, publication No. 22,623, University of Colorado, 1956, pp. 40–48.

HAROLD D. ANDERSON, Primary Examiner